United States Patent
Zhang

(10) Patent No.: US 9,897,862 B2
(45) Date of Patent: Feb. 20, 2018

(54) SPACER COMPRISING FIRST AND THIRD PORTIONS MADE OF A RIGID MATERIAL AND A SECOND PORTION MADE OF A FLEXIBLE MATERIAL, LIQUID CRYSTAL PANEL COMPRISING THE SAME, AND DISPLAY DEVICE

(71) Applicant: BOE TECHNOLOGY GROUP CO., LTD., Beijing (CN)

(72) Inventor: Yu Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 253 days.

(21) Appl. No.: 14/428,946

(22) PCT Filed: Jun. 20, 2014

(86) PCT No.: PCT/CN2014/080455
§ 371 (c)(1),
(2) Date: Mar. 17, 2015

(87) PCT Pub. No.: WO2015/109743
PCT Pub. Date: Jul. 30, 2015

(65) Prior Publication Data
US 2016/0033803 A1  Feb. 4, 2016

(30) Foreign Application Priority Data

Jan. 22, 2014 (CN) .......................... 2014 1 0030793

(51) Int. Cl.
*G02F 1/1339* (2006.01)

(52) U.S. Cl.
CPC ........ *G02F 1/13394* (2013.01); *G02F 1/1339* (2013.01); *G02F 2001/13398* (2013.01)

(58) Field of Classification Search
CPC ................... G02F 1/13394; G02F 2001/13398
See application file for complete search history.

(56) References Cited

U.S. PATENT DOCUMENTS

| 2004/0135959 A1* | 7/2004 | Choi | ................... | G02F 1/13394 349/155 |
| 2005/0140914 A1* | 6/2005 | Sawasaki | ............ | G02F 1/13394 349/155 |
| 2005/0185130 A1* | 8/2005 | Oh | ...................... | G02F 1/13394 349/156 |

(Continued)

FOREIGN PATENT DOCUMENTS

| CN | 1645200 A | * | 7/2005 |
| CN | 101201511 A | | 6/2008 |

(Continued)

OTHER PUBLICATIONS

English translation of CN1645200.*

(Continued)

*Primary Examiner* — Paul Lee
(74) *Attorney, Agent, or Firm* — Banner & Witcoff, Ltd.

(57) ABSTRACT

Embodiments of the disclosure disclose a spacer, a liquid crystal panel comprising the spacer, and a display device. The spacer comprises a first portion made of a rigid material and a second portion made of a flexible material; and the first portion and the second portion are fixedly connected with each other.

12 Claims, 1 Drawing Sheet

(56) References Cited

U.S. PATENT DOCUMENTS

| | | | |
|---|---|---|---|
| 2005/0264749 A1* | 12/2005 | Lee | G02F 1/1333 349/156 |
| 2005/0275768 A1* | 12/2005 | Tsubata | G02F 1/13394 349/106 |
| 2006/0152668 A1* | 7/2006 | Jang | G02F 1/1339 349/156 |
| 2006/0244894 A1* | 11/2006 | Yoon | G02F 1/13394 349/155 |
| 2007/0153215 A1* | 7/2007 | Lee | G02F 1/13394 349/156 |
| 2009/0168007 A1* | 7/2009 | Chung | G02F 1/13394 349/157 |
| 2010/0007843 A1* | 1/2010 | Shen | G02F 1/13394 349/155 |
| 2012/0120337 A1* | 5/2012 | Ji | G02F 1/133514 349/39 |

FOREIGN PATENT DOCUMENTS

| | | |
|---|---|---|
| CN | 202013466 U | 10/2011 |
| CN | 102736311 A | 10/2012 |
| CN | 102998852 A | 3/2013 |
| CN | 103439836 A | 12/2013 |
| CN | 103792735 A | 5/2014 |
| JP | H02223935 A | 9/1990 |

OTHER PUBLICATIONS

Nov. 19, 2015—(CN)—First Office Action Appn 201410030793.1 with English Trans.
Mar. 14, 2015—(CN)—Second Office Action Appn 201410030793.1 with English Tran.
Oct. 28, 2014—(WO) International Search Report—App PCT/CN2014/080455.

* cited by examiner

US 9,897,862 B2

SPACER COMPRISING FIRST AND THIRD PORTIONS MADE OF A RIGID MATERIAL AND A SECOND PORTION MADE OF A FLEXIBLE MATERIAL, LIQUID CRYSTAL PANEL COMPRISING THE SAME, AND DISPLAY DEVICE

The application is a U.S. National Phase Entry of International Application No. PCT/CN2014/080455 filed on Jun. 20, 2014, designating the United States of America and claiming priority to Chinese Patent Application No. 201410030793.1 filed on Jan. 22, 2014. The present application claims priority to and the benefit of the above-identified applications and the above-identified applications are incorporated by reference herein in their entirety.

TECHNICAL FIELD

Embodiments of the disclosure relate to a spacer, a liquid crystal panel comprising the spacer, and a display device.

BACKGROUND

Liquid crystal panel is a key component of a liquid crystal display. As shown in FIG. 1, the liquid crystal panel comprises an array substrate 11, a color filter substrate 12 and a liquid crystal 13 filled between the array substrate 11 and the color filter substrate 12. The array substrate 11 and the color filter substrate 12 form a closed liquid crystal cell by a cell assembly process so as to seal the liquid crystal 13 within the liquid crystal cell.

Uniformity in thickness of the liquid crystal cell is of great importance for the display quality. In order to that the thickness maintains uniform, columnar spacers 14 are disposed between the array substrate 11 and the color filter substrate 12.

In the case that the spacer 14 has a large rigidity, the spacer has a good support function for the color filter substrate 12 so as to prevent the color filter substrate 12 from deforming under an external force. In addition, the liquid crystal will shrink at low temperatures and the volume thereof will become smaller but the color filter substrate 12 substantially will not deform due to the large rigidity of the spacer 14; in this case, bubbles will occur in the liquid crystal cell if the liquid crystal cell is suddenly impacted by the external force, thus a defect called as low temperature bubble defect is generated.

In order to overcome the above defect, a solution of increasing the flexibility of the spacer 14 may be adopted. Although this solution may prevent occurrence of the above-described low temperature bubble defect, it weakens the function of the spacer 14 in supporting the color filter substrate 12; in this case, the color filter substrate 12 deforms a great deal under the external force and is not easy to restore, thus a defect called as press defect is generated.

SUMMARY

According to embodiments of the present disclosure, a spacer is provided. The spacer comprises a first portion made of a rigid material and a second portion made of a flexible material, and the first portion and the second portion are fixedly connected with each other.

For example, in a cross section of the spacer passing through a geometric center of the first portion and a geometric center of the second portion, a cross-sectional area of the second portion is smaller than a cross-sectional area of the first portion.

For example, the spacer further comprises a third portion made of the rigid material and a fourth portion made of the flexible material, the third portion and the fourth portion are fixedly connected with each other and both the second portion and the fourth portion are disposed between the first portion and the third portion.

For example, the fourth portion is in an annular shape and the fourth portion surrounds the second portion.

For example, in a cross section of the spacer passing through a geometric center of the third portion and a geometric center of the fourth portion, a cross-sectional area of the fourth portion is smaller than a cross-sectional area of the third portion.

For example, the spacer is made of a polymer material.

According to embodiments of the present disclosure, a liquid crystal panel is provided. The liquid crystal panel comprises an array substrate and an opposed substrate. The liquid crystal panel further comprises a spacer as described above, and the spacer is disposed between the array substrate and the opposed substrate.

For example, the first portion is disposed on the array substrate.

For example, the first portion is disposed on the opposed substrate.

According to embodiments of the present disclosure, a display device is provided. The display device comprises a liquid crystal panel as described above.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DESCRIPTION OF THE EMBODIMENTS

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Figure 1:
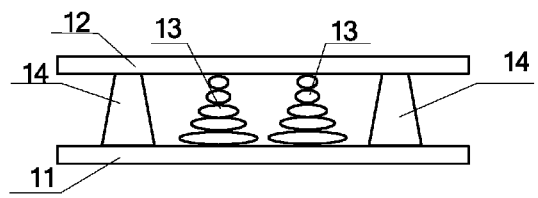
FIG. 1 is a partial sectional schematic view illustrating a liquid crystal panel according to one technique.
Figure 2:
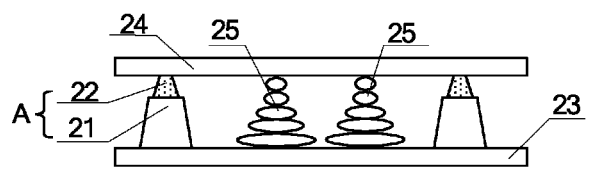
FIG. 2 is a partial sectional schematic view illustrating a liquid crystal panel according to embodiments of the present disclosure.

Embodiments of the present disclosure provide a spacer A. As shown in FIG. 2, the spacer A comprises a first portion 21 made of a rigid material and a second portion 22 made of a flexible material, and the first portion 21 and the second portion 22 are fixedly connected with each other.

FIG. 2 also illustrates an array substrate 23, an opposed substrate 24 and a liquid crystal 25 filled between the array substrate 23 and the opposed substrate 24. For example, the opposed substrate 24 is a color filter substrate. The spacer A is provided between the array substrate 23 and the opposed substrate 24 for maintaining a thickness of a liquid crystal cell, and the liquid crystal cell is formed by the array substrate 23 and the opposed substrate through a cell assembly process. Generally, an external force is exerted on the opposed substrate 24, and the external force further acts on the spacer A through the opposed substrate 24. Since the spacer A comprises the first portion 21 and the second portion 11 fixedly connected with each other and the second portion 22 is made of the flexible material, the spacer A deforms a little under the external force and correspondingly the opposed substrate 24 deforms a little; when the external force disappears, the second portion 22 made of the flexible material restores to its original state such that the opposed substrate 24 restores to its original flat state. In addition, since the first portion 21 of the spacer A is made of the rigid material, the spacer A is ensured to have a good rigidity so as to implement a good support function for the opposed substrate 24.

By adjusting the sizes of the first portion 21 and the second portion 22 of the spacer A, the rigidity and flexibility of the spacer A will simultaneously meet performance requirements of the liquid crystal panel, so that the liquid crystal panel will neither generate a low temperature bubble defect due to unexpected impact at low temperatures, nor generate a press defect because of too large flexibility of the spacer.

For example, in the cross section of the spacer A passing through a geometric center of the first portion 21 and a geometric center of the second portion 22, a cross-sectional area of the second portion 22 is smaller than a cross-sectional area of the first portion 21 (as shown in FIG. 2). In this way, the spacer A will have a better elasticity, so that the spacer A contracts timely when the external force is exerted on the opposed substrate 24 or the array substrate 23 and so that the spacer A rebounds quickly to effectively maintain the thickness of the liquid crystal cell when the external force disappears.

Figure 3:
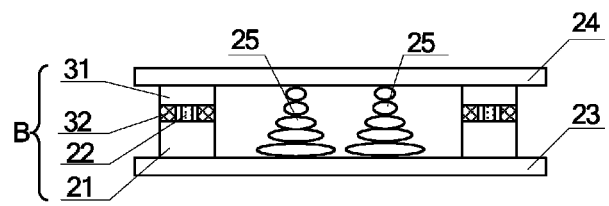
FIG. 3 is a partial sectional schematic view illustrating another liquid crystal panel according to the embodiments of the present disclosure.

The spacer is not limited to have the structure shown in FIG. 2, and for example has the structure shown in FIG. 3. The spacer B shown in FIG. 3 comprises a third portion 31 made of the rigid material and a fourth portion 32 made of the flexible material in addition to the first portion 21 and the second portion 22 same as those of the spacer A in FIG. 2; the third portion 31 and the fourth portion 32 are fixedly connected with each other; and both the second portion 22 and the fourth portion 32 are disposed between the first portion 21 and the third portion 31.

FIG. 3 also illustrates the array substrate 23, the opposed substrate 24 and the liquid crystal 25 filled between the array substrate 23 and the opposed substrate 24. The spacer B is provided between the array substrate 23 and the opposed substrate 24 for maintaining the thickness of the liquid crystal cell. As seen from FIG. 3, the spacer B employs the structure in which the flexible portions are sandwiched between two rigid portions. Since the spacer B comprises both the flexible portions and the rigid portions, its rigidity and flexibility will simultaneously meet the performance requirements of the liquid crystal panel by adjusting sizes of the flexible portions and the rigid portions of the spacer B, so that the liquid crystal panel will neither generate the low temperature bubble defect due to unexpected impact at low temperatures, nor generate the press defect because of too large flexibility of the spacer.

For example, in the spacer B shown in FIG. 3, the fourth portion 32 is in an annular shape and the fourth portion 32 surrounds the second portion 22, so that the flexible portions of the spacer B comprises the second portion 22 and the fourth portion 32 surrounding the second portion 22. For example, the first portion 21 and the second portion 22 are fixedly connected with each other, and the third portion 31 and the fourth portion 32 are fixedly connected with each other. For example, as shown in FIG. 3, the first portion 21 is disposed on the array substrate 23 and the third portion 31 is disposed on the opposed substrate 24. In the case that the opposed substrate 24 is subjected to the external force such that a displacement occurs between the portions (the first portion 21 and the second portion 22) disposed on the array substrate 23 and the portions (the third portion 31 and the fourth portion 32) disposed on the opposed substrate 24 in the spacer B, the structures of the fourth portion 32 and the second portion 22 enable the fourth portion 32 to surround the second portion 22 such that the second portion 22 is prevented from coming out of the hole of the fourth portion 32, thus a gap caused by the above displacement can be effectively prevented from generating between the portions on the array substrate 23 and the portions on the opposed substrate 24 of the spacer B, and a light leakage from the gap can be prevented.

For example, in the cross section of the spacer B passing through a geometric center of the third portion 31 and a geometric center of the fourth portion 32, a cross-sectional area of the fourth portion 32 is smaller than a cross-sectional area of the third portion 31 (as shown in FIG. 3). In this way, the spacer B will have a better elasticity, so that the spacer B contracts timely when the external force is exerted on the opposed substrate 24 or the array substrate 23 and so that the spacer B rebounds quickly to effectively maintain the thickness of the liquid crystal cell when the external force disappears.

The spacer according to the above embodiments for example is made of a polymer material, so that the spacer has better flexibility and rigidity.

Embodiments of the present disclosure further provide a liquid crystal panel. As shown in FIG. 2, the liquid crystal panel comprises the array substrate 23 and the opposed substrate 24, and the liquid crystal panel further comprises the spacer disposed between the array substrate 23 and the opposed substrate 24. The spacer is the one described in the above embodiments.

Figure 4:
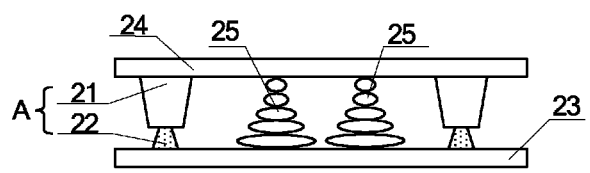
FIG. 4 is a partial sectional schematic view illustrating still another liquid crystal panel according to the embodiments of the present disclosure.

When the spacer A shown in FIG. 2 is adopted, the first portion 21 is disposed on the array substrate 23 and the second portion 22 is disposed on the opposed substrate 24, as shown in FIG. 2; or, the first portion 21 is disposed on the opposed substrate 24 and the second portion 22 is disposed on the array substrate 23, as shown in FIG. 4.

When the spacer B shown in FIG. 3 is adopted, the first portion 21 is disposed on the array substrate 23 and the third portion 31 is disposed on the opposed substrate 24, as shown in FIG. 3; or, the first portion 21 is disposed on the opposed substrate 24 and the third portion 31 is disposed on the array substrate 23.

A position of the first position 21 is determined according to practical requirements of a fabrication process of the liquid crystal panel, which will not be limited in the embodiments of the present disclosure.

In the liquid crystal panel according to the embodiments of the present disclosure, the spacer described in the above embodiments is adopted, the rigidity and flexibility of the spacer will simultaneously meet the performance requirements of the liquid crystal panel by adjusting sizes of the flexible portions and the rigid portions of the spacer, so that the liquid crystal panel will neither generate the low temperature bubble defect due to unexpected impact at low temperatures, nor generate the press defect because of too large flexibility of the spacer.

Embodiments of the present disclosure further provide a display device, and the display device comprises the liquid crystal panel described in the above embodiments. Since the spacer described in the above embodiments is comprised in the display panel, the liquid crystal panel can eliminate both the low temperature bubble defect and the press defect, and thus the display performance of the display device is significantly improved.

The foregoing embodiments merely are exemplary embodiments of the invention, and not intended to define the scope of the invention, and the scope of the invention is determined by the appended claims.

The present application claims priority of Chinese Patent Application No. 201410030793.1 filed on Jan. 22, 2014, the disclosure of which is incorporated herein by reference in its entirety as part of the present application.

What is claimed is:

1. A spacer, comprising a first portion made of a rigid material and a second portion made of a flexible material,
wherein the first portion and the second portion are fixedly connected with each other and directly in contact with each other,
wherein the spacer further comprises a third portion made of the rigid material and a fourth portion made of the flexible material, and
wherein the third portion and the fourth portion are fixedly connected with each other and directly in contact with each other, and both the second portion and the fourth portion are disposed between the first portion and the third portion.

2. The spacer according to claim 1, wherein
in a cross section of the spacer passing through a geometric center of the first portion and a geometric center of the second portion, a cross-sectional area of the second portion is smaller than a cross-sectional area of the first portion.

3. The spacer according to claim 1, wherein the fourth portion is in an annular shape and the fourth portion surrounds the second portion.

4. The spacer according to claim 1, wherein
in a cross section of the spacer passing through a geometric center of the third portion and a geometric center of the fourth portion, a cross-sectional area of the fourth portion is smaller than a cross-sectional area of the third portion.

5. The spacer according to claim 1, wherein the spacer is made of a polymer material.

6. A liquid crystal panel, comprising an array substrate and an opposed substrate, wherein the liquid crystal panel further comprises the spacer according to claim 1, and the spacer is disposed between the array substrate and the opposed substrate.

7. The liquid crystal panel according to claim 6, wherein the first portion is disposed on the array substrate.

8. The liquid crystal panel according to claim 6, wherein the first portion is disposed on the opposed substrate.

9. A display device, comprising the liquid crystal panel according to claim 6.

10. The spacer according to claim 3, wherein
in a cross section of the spacer passing through a geometric center of the third portion and a geometric center of the fourth portion, a cross-sectional area of the fourth portion is smaller than a cross-sectional area of the third portion.

11. A spacer, comprising a first portion made of a rigid material and a second portion made of a flexible material,
wherein the first portion and the second portion are fixedly connected with each other,
wherein the spacer further comprises a third portion made of the rigid material and a fourth portion made of the flexible material,
wherein the third portion and the fourth portion are fixedly connected with each other and both the second portion and the fourth portion are disposed between the first portion and the third portion, and
wherein in a cross section of the spacer passing through a geometric center of the first portion and a geometric center of the second portion, a cross-sectional area of the second portion is smaller than a cross-sectional area of the first portion.

12. A spacer, comprising a first portion made of a rigid material and a second portion made of a flexible material,
wherein the first portion and the second portion are fixedly connected with each other,
wherein the spacer further comprises a third portion made of the rigid material and a fourth portion made of the flexible material,
wherein the third portion and the fourth portion are fixedly connected with each other and both the second portion and the fourth portion are disposed between the first portion and the third portion, and
wherein the fourth portion is in an annular shape and the fourth portion surrounds the second portion.

* * * * *